United States Patent
Abdallah et al.

(10) Patent No.: US 8,170,718 B2
(45) Date of Patent: May 1, 2012

(54) MULTIPLE PRIORITY OPERATIONAL SPACE IMPEDANCE CONTROL

(75) Inventors: Muhammad E. Abdallah, Houston, TX (US); Matthew J. Reiland, Oxford, MI (US); Robert Platt, Houston, TX (US); Charles W. Wampler, II, Birmingham, MI (US); Brian Hargrave, Dickenson, TX (US)

(73) Assignees: GM Global Technology Operations LLC, Detroit, MI (US); The United States of America as represented by the Administrator of the National Aeronautics and Space Administrations, Washington, DC (US)

( * ) Notice: Subject to any disclaimer, the term of this patent is extended or adjusted under 35 U.S.C. 154(b) by 655 days.

(21) Appl. No.: 12/338,697

(22) Filed: Dec. 18, 2008

(65) Prior Publication Data

US 2010/0161127 A1 Jun. 24, 2010

(51) Int. Cl.
*G06F 19/00* (2011.01)

(52) U.S. Cl. ........ 700/245; 700/250; 700/253; 700/254; 700/255

(58) Field of Classification Search ............... 318/568.1, 318/611, 632, 568.21–568.24, 606, 615–623, 318/626; 901/1–50; 700/245–264
See application file for complete search history.

(56) References Cited

U.S. PATENT DOCUMENTS

| | | | |
|---|---|---|---|
| 4,860,215 A | 8/1989 | Seraji | |
| 4,974,210 A | 11/1990 | Lee | |
| 5,103,404 A | 4/1992 | McIntosh | |
| 5,499,320 A | 3/1996 | Backes et al. | |
| 6,081,754 A | 6/2000 | Schlemmer | |
| 6,226,566 B1 | 5/2001 | Funda et al. | |
| 6,393,340 B2 | 5/2002 | Funda et al. | |
| 2006/0048364 A1 | 3/2006 | Zhang et al. | |
| 2007/0255454 A1 | 11/2007 | Dariush | |
| 2008/0046122 A1 | 2/2008 | Manzo et al. | |
| 2008/0140257 A1 | 6/2008 | Sato et al. | |

FOREIGN PATENT DOCUMENTS

JP 2008-36761 A 2/2008

*Primary Examiner* — Khoi Tran
*Assistant Examiner* — Bhavesh V Amin
(74) *Attorney, Agent, or Firm* — John A. Miller; Miller IP Group, PLC

(57) ABSTRACT

A system and method for providing multiple priority impedance control for a robot manipulator where impedance laws are realized simultaneously and with a given order of priority. The method includes a control scheme for realizing a Cartesian space impedance objective as a first priority while also realizing a joint space impedance objective as a second priority. The method also includes a control scheme for realizing two Cartesian space impedance objectives with different levels of priority. The method includes instances of the control schemes that use feedback from force sensors mounted at an end-effector and other instances of the control schemes that do not use this feedback.

18 Claims, 3 Drawing Sheets

MULTIPLE PRIORITY OPERATIONAL SPACE IMPEDANCE CONTROL

STATEMENT REGARDING FEDERALLY SPONSORED RESEARCH OR DEVELOPMENT

The invention described herein may be manufactured and used by or for the U.S. Government for U.S. Government (i.e., non-commercial) purposes without the payment of royalties thereon or therefore.

BACKGROUND OF THE INVENTION

1. Field of the Invention

This invention relates generally to a system for controlling the impedance of a robotic manipulator and, more particularly, to a scheme for multiple prioritized operational space impedances at different points on a robotic manipulator.

2. Discussion of the Related Art

Arms and manipulators are essential to many robotic tasks. For example, they are essential to robotic assembly tasks. Many robot arms and manipulators designed for factory use are stiff, high-impedance arms that operate using position control systems. However, the ability to control forces applied by the robot on the environment is also useful in assembly tasks. In particular, it is useful to be able to control the impedance of the manipulator, i.e., the relationship between applied environmentally forces and manipulator position.

Active impedance control of robot arms and manipulators has been studied and different approaches have been proposed. One of the earliest approaches was a strategy for controlling end-effector stiffness in Cartesian coordinates. Assuming the existence of a low-level torque controller, this approach calculated the joint torque corresponding to a Cartesian space error given a desired Cartesian space end-effector stiffness. This can be considered to be a system for achieving a desired linear zero-order impedance. This approach was later expanded into a system for controlling second-order linear impedance. In this approach, the control system attempts to adjust not only the stiffness, but also the manipulator damping and the inertia.

Another body of work relevant to the current invention is multiple-priority velocity and acceleration control. It is well known that because a robot manipulator has enough actuated degrees of freedom, a manifold of joint configurations may exist that place the end effector in the same position and orientation. This property is known as the kinematic redundancy of the manipulator and has been used primarily to enable robots to achieve multiple velocity or acceleration objectives at once. For example, with a seven degree-of-freedom (DOF) humanoid manipulator, it is possible to place the manipulator end-effector in a particular pose while also adjusting the position of the elbow as desired. Typically, position objective are assigned priorities with lower-priority position objective operating subject to higher-priority objectives.

SUMMARY OF THE INVENTION

In accordance with the teachings of the present invention, a system and method are disclosed for providing multiple priority impedance control for a robot manipulator where multiple impedance laws are realized simultaneously and with a given order of priority. The method includes a control scheme for realizing a Cartesian space impedance objective as a first priority while also realizing a joint space impedance objective as a second priority. The method also includes a control scheme for realizing two Cartesian space impedance objectives with different levels of priority. The method includes instances of the control schemes that use feedback from force sensors mounted at an end-effector and other instances for the control schemes that do not use this feedback.

Additional features of the present invention will become apparent from the following description and appended claims, taken in conjunction with the accompanying drawings.

DETAILED DESCRIPTION OF THE EMBODIMENTS

The following discussion of the embodiments of the invention is directed to a system and method for providing hierarchical impedance control of a robotic system is merely exemplary in nature, and is in no way intended to limit the invention or its applications or uses.

The embodiments of the invention are described in terms of the following generalized equation of motion for a robot manipulator with n revolute joints:

$$A\ddot{q} + \eta = \tau_a + \tau \quad (1)$$

Where A is the n×n manipulator inertia matrix, $\ddot{q}$ is an n-vector of manipulator joint accelerations, $\tau$ is an n-vector of torques resulting from externally applied loads and $\tau_a$ is a vector of actuator torques.

$\eta$ describes the sum of friction, coriolis, centrifugal and gravitational torques as:

$$\eta = t + c + g \quad (2)$$

Where t is the vector of frictional forces, c is a vector of manipulator centrifugal and coriolis forces and g is a vector of manipulator gravity forces. The dependence of A, c and g on manipulator configuration is implicitly assumed.

It is frequently useful to design controllers defined in operational space coordinates rather than in the joint space. The term "operational space" may refer to any coordinate system mapped onto by the joint space. Frequently, the operational space coordinates of most interest are considered to be the space of Cartesian positions and orientations of a point resolution (POR) on the manipulator. Another alternative is an operational space coordinate system that described a system state in relation to a scalar potential function in the joint space. When operational space coordinates describe the Cartesian pose, then the pose of the POR as an element of SE that will be represented in exponential coordinates (a six-vector where the first three numbers described position and the last three numbers describe orientation using the axis-angle representation). The Cartesian velocity of the POR will be represented as a twist and the acceleration as the derivative of twist. Similarly, loads in Cartesian space will be written as wrenches (six-vector that concentrates a force and a moment).

The POR Jacobian J is an important quantity that relates joint velocities $\dot{q}$ to Cartesian twists at the POR, $\dot{x}$:$\dot{x}=J\dot{q}$. Using a virtual work argument, the POR Jacobian can also be shown to relate wrenches applied to the POR by external sources f to the joint torques $\tau$ that gives: $\tau=J^T f$. The acceleration of the POR is calculated by solving equation (1) for $\ddot{x}$:

$$\ddot{x}=JA^{-1}(\tau-\tau_a+\eta)+\dot{J}\dot{q} \tag{3}$$

Figure 1:
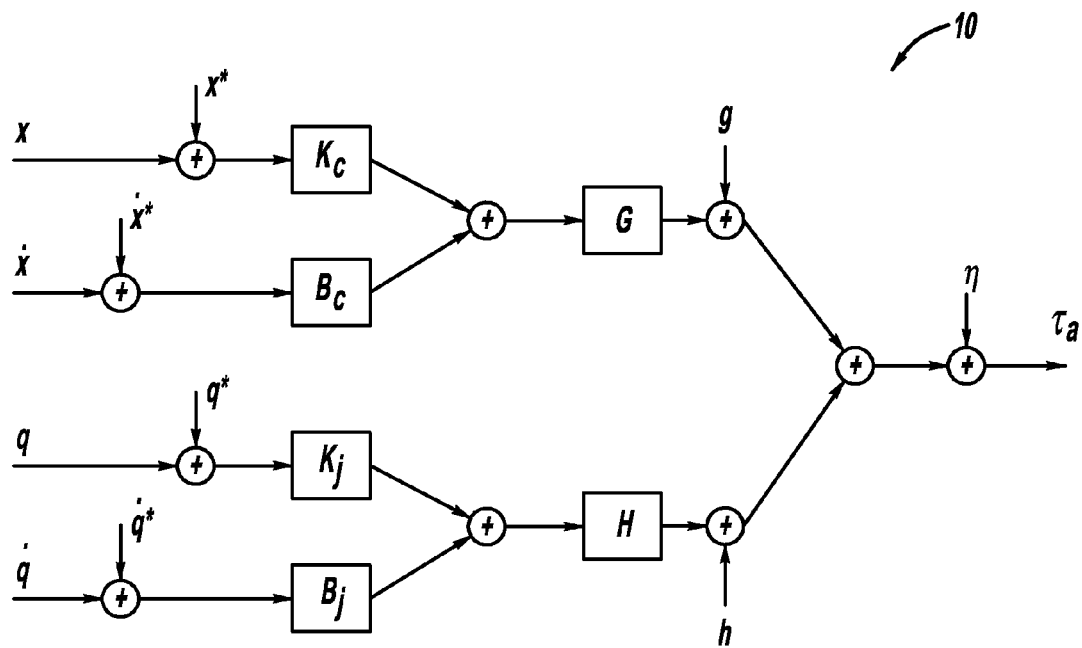
FIG. 1 is a block diagram of a system for providing Cartesian impedance with a subordinate joint space impedance task.
Figure 2:
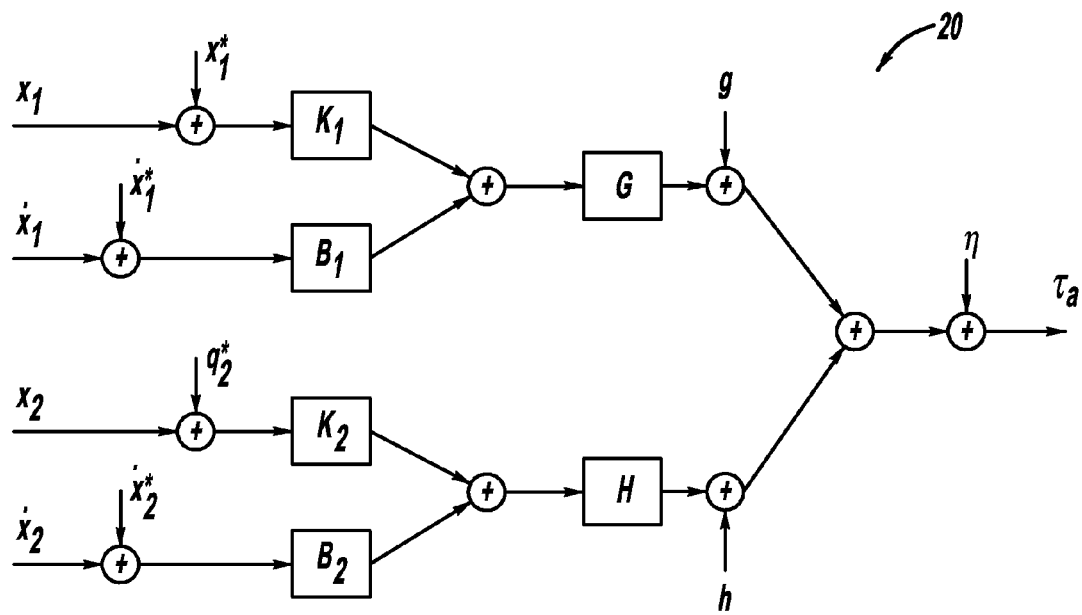
FIG. 2 is a block diagram of a system for providing cartesian impedance with a subordinate cartesian space impedance task.

FIG. 1 is a block diagram of a system 10 for providing Cartesian impedance with a subordinate joint space impedance task and FIG. 2 is a block diagram of a system 20 for providing Cartesian impedance with a subordinate Cartesian space impedance task which will be used in the analysis below. From the systems 10 and 20 it is clear that the space of actuator torques that solve $JA^{-1}\tau_a=0$ result in zero POR accelerations. Therefore, any actuator torque, $\tau_a=AN\gamma^*$, results in null space accelerations with free variable. Note that this matrix, AN, performs a similar function as the inertia-weighted null space.

Each embodiment can be described in terms of one of the two block diagrams in the systems 10 and 20 where in either case different terms substitute for the G and H blocks.

Based on the above analysis, the first-order impedance embodiments of this invention are realized by the following control law. Allow a change of variables such that a new control variable $\tau'$ specifies actuator torques according to:

$$\tau_a=\eta-\tau' \tag{4}$$

Recall that $\eta$ is the sum of frictional, coriolis centrifugal, and gravitational torques. Then the Cartesian control law can be specified as:

$$\tau' = J^T f^* + AN\gamma^* + A\dot{J}\dot{q} \tag{5}$$

Where:

$$f^* = B_c \dot{\tilde{x}} + K_c \tilde{x} + f_{des} \tag{6}$$

Equation (6) is a desired Cartesian space first order linear impedance, and $\gamma^*$ is a free null space variable. $B_c$ and $K_c$ are the Cartesian space damping and stiffness matrices and $f_{des}$ is a desired reference wrench. This control law requires measurement of the Cartesian velocity and pose error $\dot{\tilde{x}}$ and $\tilde{x}$ defined with respect to velocity and pose references $\dot{x}^*$ and $x^*$. As expected, $\gamma^*$ may be set arbitrarily without changing the acceleration of force applied by the POR. Substituting equations (2), (3) and (4) back into equation (1) gives:

$$\Lambda\ddot{x}+f^*=\Lambda J A^{-1}\tau \tag{7}$$

For an arbitrary value of $\gamma^*$ where $\Lambda=(JA^{-1}J^T)^{-1}$ is the Cartesian space passive manipulator inertia. When forces are applied only to the POR, then equation (7) reduces to:

$$\Lambda\ddot{x}+f^*=f \tag{8}$$

In one embodiment, the controller realizes a second-priority joint space impedance while also realizing the first-priority first order Cartesian space impedance. The second-priority impedance is:

$$A\ddot{\tilde{q}} + \tau^* = \tau \tag{9}$$

Where:

$$\tau^* = B\dot{\tilde{q}} + K\tilde{q} + \tau_{des} \tag{10}$$

B and K are the joint space damping and stiffness matrices, respectively, and $\tau_{des}$ is a desired external torque.

$\dot{\tilde{q}}$ and $\tilde{q}$ are the joint velocity and position errors resured with respect to the joint velocity and position references $\dot{q}^*$ and $q^*$ respectively. Note that this is really just a first order impedance specification because the passive inertia is left unchanged.

Since the passive inertia of the manipulator remains unchanged, it is possible to select the $\gamma^*$ that minimizes the joint acceleration error or the joint torque error. First, consider minimizing the joint acceleration error. The acceleration required by the second-priority joint impedance is:

$$\ddot{q}'=A^{-1}(\tau-\tau^*) \tag{11}$$

The acceleration realized by the first-priority control law is:

$$\ddot{q}=A^{-1}\tau-A^{-1}J^T f^*-N\gamma^* \tag{12}$$

The $\gamma^*$ that minimizes the different between $\ddot{q}'$ and $\ddot{q}$ is:

$$\gamma^*_{min} = \arg\min_\gamma \|\ddot{q}' - \ddot{q}\| \tag{13}$$
$$= \arg\min_\gamma \|N\gamma + A^{-1}J^T f^* - A^{-1}\tau^*\|$$
$$= NA^{-1}(\tau^* - J^T f^*).$$

Therefore, the multi-priority control law that minimizes second-priority acceleration error is:

$$\tau'=(I-ANA^{-1})J^T f^*+ANA^{-1}\tau^*+A\dot{J}\dot{q} \tag{14}$$

It is also possible to select the $\gamma^*$ that minimizes the error in joint torques resulting from externally applied forces. The torque required to realize the second priority joint impedance is:

$$\tau'=A\ddot{q}+\tau^* \tag{15}$$

The torque applied to the environment by the first priority control law is:

$$\tau=A\ddot{q}+J^T f^*+AN\gamma^* \tag{16}$$

The value of $\gamma^*$ that minimizes the second-priority torque error is:

$$\gamma_{min} = \arg\min_\gamma \|\tau' - \tau\| \tag{17}$$
$$= \arg\min_\gamma \|\tau^* - J^T f^* - AN\gamma^*\|$$
$$= (AN)^+(\tau^* - J^T f^*)$$

Therefore, the multi-priority control law that minimizes the second-priority torque error is:

$$\tau'=(I-A(AN)^+)J^T f^*+A(AN)^+\tau^*+A\dot{J}\dot{q} \tag{18}$$

In another embodiment, the controller realizes a second-priority Cartesian impedance while also realizing the first-priority first order Cartesian space impedance. Since the first-priority impedance remains the same as it was in the previous embodiment, this embodiment re-uses the control law of equation (5). $\gamma^*$ must be chosen to optimize manipulator dynamics for the second-priority Cartesian impedance. The second priority impedance is:

$$\Lambda_2 \ddot{x}_2 + f_2^* = \Lambda_2 J_2 A^{-1} \tau \quad (19)$$

Where $\Lambda_2 = (J_2 A J_2^T)^{-1}$ is the passive inertia of the manipulator, $J_2$ is the Jacobian matrix, and $f_2$ is the force applied at the second POR by an external source. $f_2^*$ is:

$$f_2^* = B_2 \dot{\tilde{x}}_2 + K_2 \tilde{x}_2 \quad (20)$$

Note that when forces are applied at the second POR only, equation (20) becomes:

$$\Lambda_2 \ddot{x}_2 + f_2^* = f_2 \quad (21)$$

As with the second-priority joint space impedance law, the passive inertia of the manipulator remains unchanged because the first-priority impedance is first order. The space of second-POR accelerations that can be realized by the first priority Cartesian impedance is found using equation (12):

$$\ddot{x}_2 = J_2 A^{-1} \tau - J_2 A^{-1} J^T f^* - J_2 N \gamma^* + \dot{J}_2 \dot{q} \quad (22)$$

The second-POR acceleration required by the second-priority Cartesian impedance in equation (19) is:

$$\ddot{x}_2' = J_2 A^{-1} \tau - J_2 A^{-1} J_2^T f_2^* \quad (23)$$

The $\gamma^*$ that minimizes the difference between $\ddot{x}_2$ and $\ddot{x}_2'$ is:

$$\gamma_{min} = \underset{\gamma}{\operatorname{argmin}} \|\ddot{x}_2' - \ddot{x}_2\| \quad (24)$$

$$= \underset{\gamma}{\operatorname{argmin}} \left\| \begin{array}{c} J_2 A^{-1} J^T f^* + J_2 N \gamma^* - \\ J_2 A^{-1} J_2^T f_2^* - \dot{J}_2 \dot{q} \end{array} \right\|$$

$$= (AN)^+ (\tau^* - J^T f^*)$$

Where $\Lambda_2 = (J_2 A^{-1} J_2^T)^{-1}$.

Substituting $\gamma_{min}^*$ into the control law of equation (5) gives:

$$\tau' = (I - (J_2 N)^+ J_2 A^{-1}) J^T f^* + (J_2 N)^+ (\Lambda_2^{-1} f_2^* + \dot{J}_2 \dot{q}) + A \dot{J}_2 \dot{q} \quad (25)$$

It is also possible to realize second-priority second order joint and Cartesian space impedances. This requires an additional measurement of externally applied forces or joint accelerations. In these embodiments, the first-priority Cartesian space impedance is:

$$M \ddot{\tilde{x}} + f^* = f \quad (26)$$

Where f* is defined in equation (6) and $$\ddot{\tilde{x}} = \ddot{x} - \ddot{x}^*$$

is POR acceleration error with respect to an acceleration reference $\ddot{x}^*$.

The prioritization of the impedance laws is realized by selecting the joint space acceleration closest to that required by the secondary impedance law while still realizing the primary impedance. The space of joint accelerations that realize the first-priority Cartesian impedance is:

$$\ddot{q} = J^+ \ddot{x}^* + J^+ M^{-1}(f - f^*) + N\lambda - J^+ \dot{J} \dot{q} \quad (27)$$

For a second-priority impedance expressed in the joint space, the impedance law is:

$$\Gamma \ddot{q} + \tau^* = \tau \quad (28)$$

The corresponding joint acceleration is:

$$\ddot{q}' = \ddot{q}^* + \Gamma^{-1}(\tau - \tau^*) \quad (29)$$

The value of $\gamma$ is solved for that minimizes $\|\ddot{q} - \ddot{q}'\|$. Expanding this expression, to find:

$$\lambda_{min} = \quad (30)$$

$$\underset{\lambda}{\operatorname{argmin}} \|J^+ \ddot{x}^* + J^+ M^{-1}(f - f^*) + N\lambda - J^+ \dot{J} \dot{q} - \ddot{q}^* - \Gamma^{-1}(\tau - \tau^*)\|$$

The solution can be found by taking the pseudoinverse of N and using the fact that since N is a projection the matrix $N = N^+$:

$$\gamma_{min} = N(\ddot{q}^* + \Gamma^{-1}(\tau - \tau^*)) \quad (31)$$

Substituting into equation (1) and using the fact that since N is idempotent, $N = NN$, the resulting control law is:

$$\tau_a = A\ddot{q} - \tau + \eta \quad (32)$$

$$= AJ^+ \left( \ddot{x}^* + M^{-1}(f - f^*) - \dot{J}\dot{q} \right) + AN\lambda_{min} - \tau + \eta$$

$$= AJ^+ \left( \ddot{x}^* + M^{-1}(f - f^*) - \dot{J}\dot{q} \right) + AN(\ddot{q}^* + \Gamma^{-1}$$

$$(\tau - \tau^*) - \tau + \eta$$

Note again that this control law requires measurements of the joint torques $\tau$ and POR forces f resulting from externally applied forces.

Rather than realizing a second-priority joint space impedance, it is possible to realize a second priority Cartesian space impedance instead. The first-priority objective is still the second order impedance of equation (26). The second-priority impedance is defined in the Cartesian space:

$$M_2 \ddot{\tilde{x}}_2 + f_2^* = f_2 \quad (33)$$

Where $f_2^*$ is:

$$f_2^* = B_2 \dot{\tilde{x}}_2 + K_2 \tilde{x} \quad (34)$$

As before, the space of joint space accelerations that realize equation (26) is given by equation (27). The corresponding space of Cartesian accelerations at the second POR is:

$$\ddot{x}_2 = J_2 J^+ [\ddot{x}^* + M^{-1}(f - f^*)] + J_2 N\lambda - J_2 J^+ \dot{J} \dot{q} + \dot{J}_2 \dot{q} \quad (35)$$

Where $J_2$ is the manipulator Jacobian matrix associated with $x_2$.

Re-arranging equation (33), the desired Cartesian acceleration at the second POR is:

$$\ddot{x}_2' = \ddot{x}_2^* + M_2^{-1}(f_2 - f_2^*) \quad (36)$$

The approach to realizing equation (33) as a second priority is to find the value for λ that makes equation (35) as close as possible to $\ddot{x}_2'$. Equivalently:

$$\gamma_{min} = \underset{\gamma}{\operatorname{argmin}} \|\ddot{x}_2 - \ddot{x}_2'\| \quad (37)$$

$$= \underset{\gamma}{\operatorname{argmin}} \left\| \begin{array}{c} J_2 J^+(\ddot{x}^* + M^{-1}(f - f^*)) + J_2 N\lambda - \\ J_2 J^+ \dot{J}\dot{q} + \dot{J}_2 \dot{q} - \ddot{x}_2^* - \dot{M}_2^{-1}(f_2 - f_2^*) \end{array} \right\|$$

$$= \hat{J}_2^+ \left[ \begin{array}{c} \ddot{x}_2^* + M_2^{-1}(f_2 - f_2^*) - J_2 J^+ \\ (\ddot{x}^* + M^{-1}(f - f^*)) - \dot{J}_2 \dot{q} + J_2 J^+ \dot{J}\dot{q} \end{array} \right]$$

Where $\hat{J}_2 = J_2 N$.

Substituting into equation (1), the resulting control law is:

$$\tau_a = A(I - \hat{J}_2^+ J_2)\hat{J}_1^+[\ddot{x}^* + M^{-1}(f - f^*) - \dot{J}\dot{q}] + A\hat{J}_2^+[\ddot{x}_2^* + M_2^{-1}(f_2 - f_2^*) - \dot{J}_2 \dot{q}] + \eta - \tau \quad (38)$$

This control law realizes the first-priority impedance law for the first POR in equation (26) while also realizing the second-priority impedance at the second POR in equation (33) to the extent possible without disrupting the first impedance objective.

Another embodiment of the invention realizes a dual-priority Cartesian stiffness at two PORs. The stiffness objective at the first POR is:

$$f = f^* \quad (39)$$

Where $f^*$ is defined in equation (6).

The stiffness objective at the second POR is:

$$f_2 = f_2^* \quad (40)$$

Where $f_2^*$ is defined in equation (34).

The first objective is realized by applying a torque from the space:

$$\tau = J^T f_1^* + N_1 \lambda \quad (41)$$

Where λ is arbitrary.

J is the Jacobian for the first POR and $N = I - J^+ J$ is the associated null space projection matrix. This space of joint torques correspond to the following set of wrenches at the second POR:

$$f_2 J_2^{+^T} J_1^T f_1^* + J_2^{+^T} N_1 \lambda \quad (42)$$

Where $J_2$ is the Jacobian for the second POR.

Finding the value for λ that makes $f_2$ as close as possible to $f_2^*$ gives:

$$\gamma_{min} = \underset{\lambda}{\operatorname{argmin}} \|f_2 - f_2^*\| \quad (43)$$

$$= \underset{\lambda}{\operatorname{argmin}} \left\| J_2^{+^T} J_1^T f_1^* + J_2^{+^T} N_1 \lambda - f_2^* \right\|$$

$$= \hat{J}_2^+ \left[ f_2^* - J_2^{+^T} J_1^T f_1^* \right]$$

Where $\hat{J}_2 = J_2^{+^T} N$.

Integrating this result with equation (41), the joint torque that optimally achieves both prioritized objectives is:

$$\tau = (I - \hat{J}_2^+ J_2^{+^T}) J^T f^* + \hat{J}_2^+ f_2^* \quad (44)$$

Substituting into equation (1) and setting accelerations to zero (because of the steady-state assumption) gives the following control law:

$$\tau_a = -(I - \hat{J}_2^+ J_2^{+^T}) J^T f^* + \hat{J}_2^+ f_2^* + \eta \quad (45)$$

Figure 3:
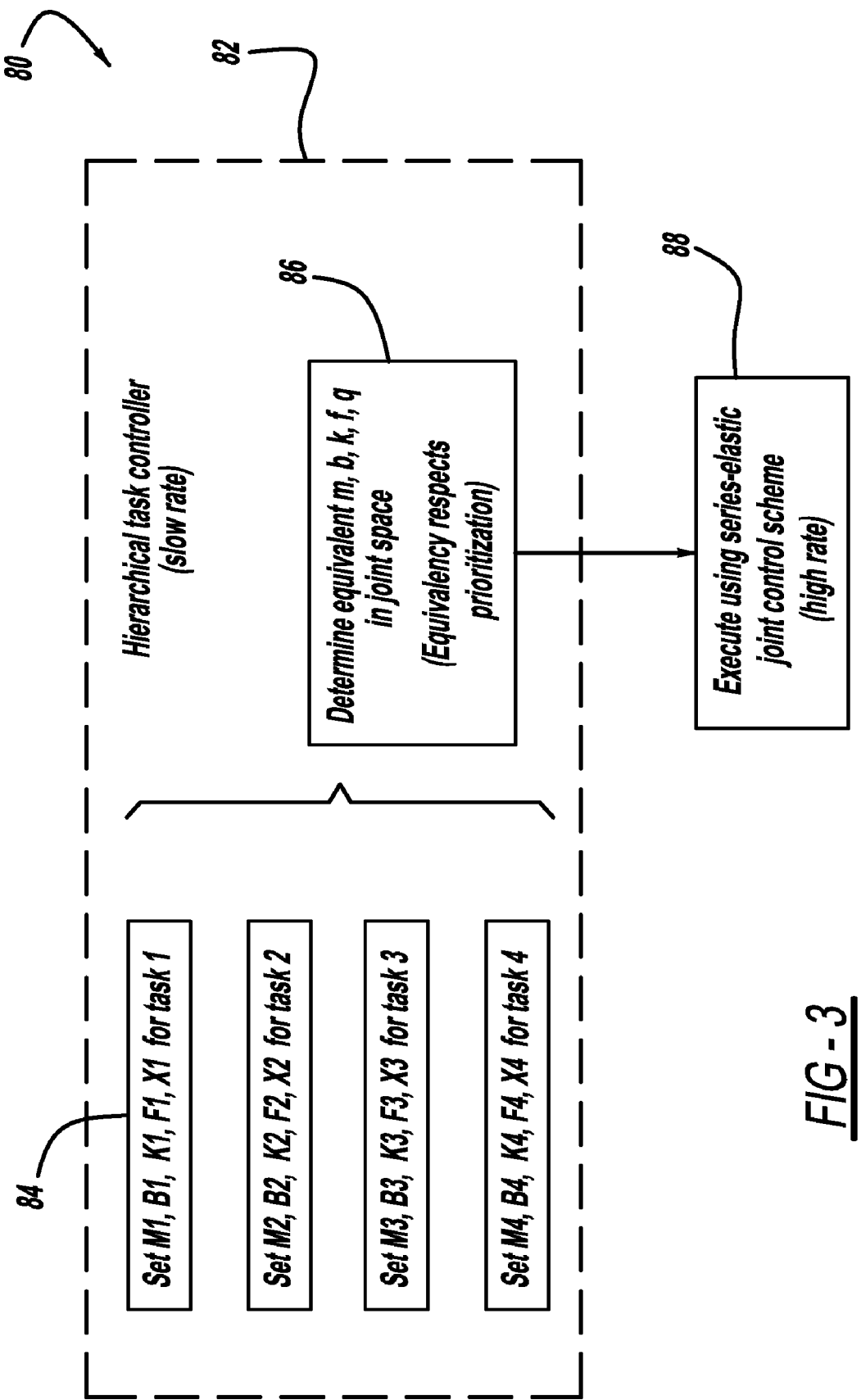
FIG. 3 is a flow chart diagram showing hierarchical impedance control.

FIG. 3 is a flow chart diagram 80 showing a depiction of how a system and method of the invention combines force control, position control and impedance control in task coordinates for multi-priority impedance control. The diagram 80 includes a hierarchical task controller 82 that identifies a number of tasks at boxes 84 for a particular robotic arm. Each task has a certain mass M, damping B and stiffness K for the impedance control portion of the task and a particular force F and task position X for the position control portion of the task. Because the operation is performing impedance control, each of the mass M, damping B and stiffness K are defined. Particularly, for example, a robotic finger moves to the particular position X with the particular force F defined by that task. Once all of the tasks at the boxes 84 have been identified in a hierarchical manner, the process determines the equivalent values for the mass, damping, stiffness, force and position in the joint space at box 86. Once each of the equivalent values for the mass, damping, stiffness, force and position is provided in the joint space for the joints of the robotic arm, then the tasks are performed at box 88 using a series-elastic joint control scheme at a high-rate operation. The tasks are executed based on the hierarchy control defined by the multiple priority impedance control.

Figure 4:
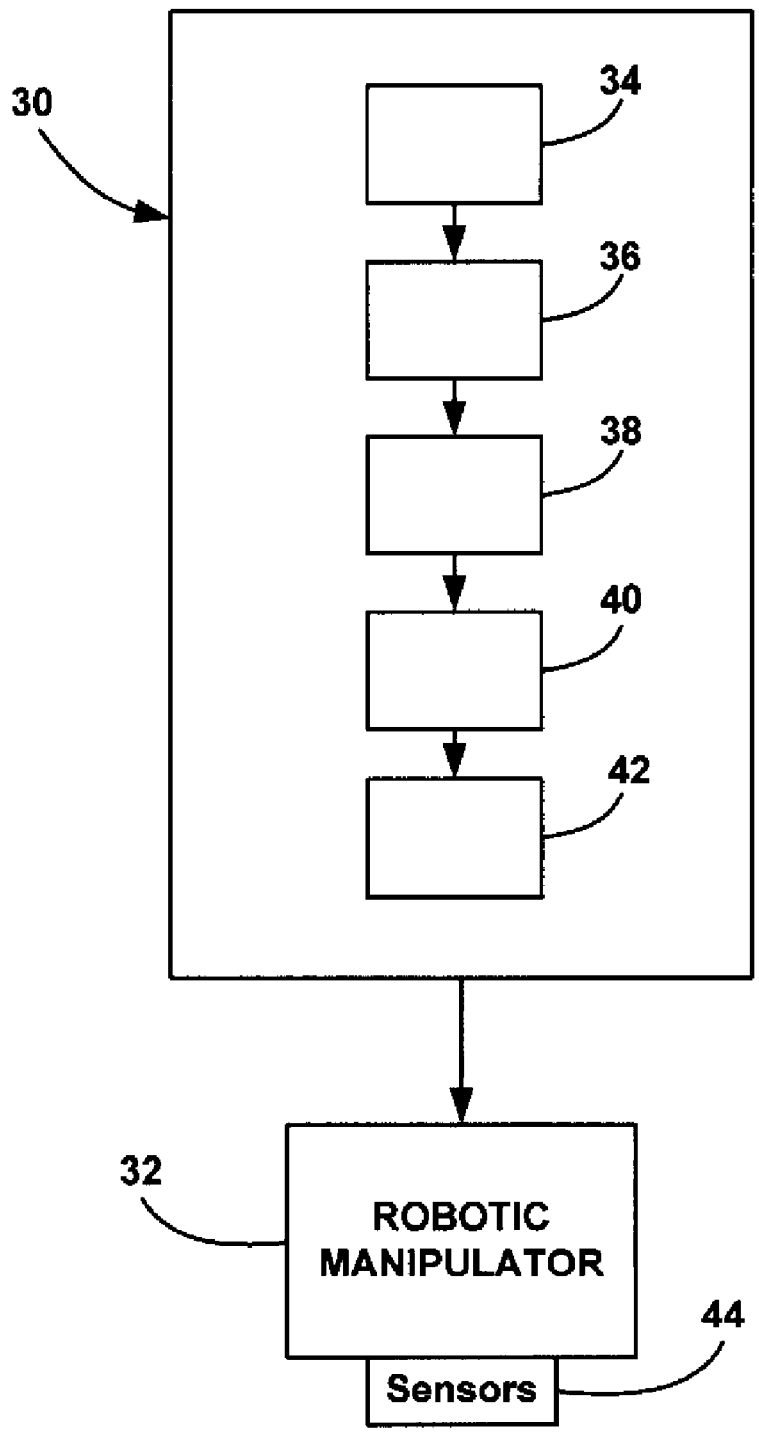
FIG. 4 is a block diagram of a system for providing multiple priority operational space impedance or stiffness control for a robotic manipulator.

FIG. 4 is a block diagram of a system 30 for providing multiple priority operational space impedance or stiffness control for a robotic manipulator 32. The manipulator 32 realizes an impedance that minimizes an acceleration error between a lower priority impedance objective and a manifold of equally good joint accelerations and realizes an impedance or stiffness objective that minimizes a torque error between the lower priority impedance objective and a manifold of equally good joint torques. At a given instant in time, a set of high priority impedance objectives describe a manifold of joint accelerations or joint torques that realize a set of high priority of impedance objectives equally well. The impedance or stiffness objectives are zero order, first order or second order linear impedances. A pseudoinverse is used to calculate a minimum acceleration or torque error. Also, either a null space of a Jacobian or Jacobian null space weighted by passive manipulator inertia is used to realize lower-priority impedance or stiffness objectives.

The system 30 includes a means 34 for defining a plurality of different impedance or stiffness objectives defined operational space or joint space and a means 36 for assigning a priority to the different impedance or stiffness objectives. The system 30 also includes a means 38 for controlling a manipulator impedance such that a primary priority impedance or stiffness objective is realized, a means 40 for controlling the manipulator impedance such that a secondary priority impedance or stiffness objective is realized to the extent possible while still realizing the primary priority impedance or stiffness objective, and a means 42 for controlling the manipulator impedance such that lower priority impedance or stiffness objectives are realized to the extent possible while realizing all higher priority impedance or stiffness objectives.

The primary priority impedance objective is defined in Cartesian space and the secondary priority impedance objective is defined in the joint space. The primary and secondary priority impedance or stiffness objectives are defined in Cartesian space. Cartesian space force sensors 44 are mounted on the manipulator 32 and are used to measure applied forces at multiple positions, where the force measurements are used to implement prioritized impedance objectives. Multiple priority impedance or stiffness objectives can be realized without using Cartesian space force sensors and while retaining passive inertia of the manipulator 32. The Cartesian space impedance or stiffness objectives are defined with zero stiffness in one or more of Cartesian space directions. An offset force is applied in zero stiffness directions so that the manipulator 32 applies a constant Cartesian space force in that direction. An additional force compensation scheme is used to regulate forces in the zero-stiffness Cartesian space direction.

What is claimed is:

1. A method for providing multiple priority operational space impedance or stiffness control for robotic manipulators, said method comprising:
    defining, on a processor a plurality of different impedance or stiffness objectives defined operational space or joint space;
    assigning a priority to the different impedance or stiffness objectives;
    controlling a manipulator impedance such that a primary priority impedance or stiffness objective is realized;
    controlling the manipulator impedance such that a secondary priority impedance or stiffness objective is realized to the extent possible while still realizing the primary priority impedance or stiffness objective; and
    controlling the manipulator impedance such that lower priority impedance or stiffness objectives are realized to the extent possible while realizing all higher priority impedance or stiffness objectives.

2. The method according to claim 1 wherein, at a given instant in time, a set of high priority impedance objectives describe a manifold of joint accelerations or joint torques that realize a set of high priority impedance objectives equally well.

3. The method according to claim 1 wherein the impedance or stiffness objectives are zero order, first order or second order linear impedances.

4. The method according to claim 2 wherein the manipulators realize an impedance that minimizes an acceleration error between a lower priority impedance objective and a manifold of equally good joint accelerations, the manipulator realizes an impedance or stiffness objective that minimizes a torque error between the lower priority impedance objective and a manifold of equally good joint torques.

5. The method according to claim 4 wherein a pseudoinverse is used to calculate a minimum acceleration or torque error.

6. The method according to claim 4 wherein either a null space of a Jacobian or a Jacobian null space weighted by passive manipulator inertia is used to realize lower-priority impedance or stiffness objectives.

7. The method according to claim 3 wherein the primary priority impedance objective is defined in Cartesian space and the secondary priority impedance objective is defined in the joint space, the primary and secondary priority impedance or stiffness objectives are defined in Cartesian space.

8. The method according to claim 7 wherein Cartesian space force sensors mounted on the robot manipulator are used to measure applied forces at multiple positions and these force measurements are used to implement prioritized impedance objectives.

9. The method according to claim 7 wherein multiple priority impedance or stiffness objectives are realized without using Cartesian space force sensors and while retaining passive inertia of the manipulator.

10. The method according to claim 7 wherein the Cartesian space impedance or stiffness objectives are defined with zero stiffness in one or more of Cartesian space directions.

11. The method according to claim 7 wherein an offset force is applied in zero stiffness directions such that the manipulator applies a constant Cartesian space force in this direction.

12. The method according to claim 11 wherein an additional force compensation scheme is used to regulate forces in the zero-stiffness Cartesian space direction.

13. A system for providing multiple priority operational space impedance or stiffness control for robotic manipulators, said system comprising:
    means for defining a plurality of different impedance or stiffness objectives defined operational space or joint space;
    means for assigning a priority to the different impedance or stiffness objectives;
    means for controlling a manipulator impedance such that a primary priority impedance or stiffness objective is realized;
    means for controlling the manipulator impedance such that a secondary priority impedance or stiffness objective is realized to the extent possible while still realizing the primary priority impedance or stiffness objective; and
    means for controlling the manipulator impedance such that lower priority impedance or stiffness objectives are realized to the extent possible while realizing all higher priority impedance or stiffness objectives.

14. The system according to claim 13 wherein the impedance or stiffness objectives are zero order, first order or second order linear impedances.

15. The system according to claim 14 wherein the manipulators realize an impedance that minimizes an acceleration error between a lower priority impedance objective and a manifold of equally good joint accelerations, the manipulator realizes an impedance or stiffness objective that minimizes a torque error between the lower priority impedance objective and a manifold of equally good joint torques.

16. The system according to claim 15 wherein a pseudoinverse is used to calculate a minimum acceleration or torque error.

17. The system according to claim 15 wherein either a null space of a Jacobian or a Jacobian null space weighted by passive manipulator inertia is used to realize lower-priority impedance or stiffness objectives.

18. The system according to claim 14 wherein the primary priority impedance objective is defined in Cartesian space and the secondary priority impedance objective is defined in the joint space, the primary and secondary priority impedance or stiffness objectives are defined in Cartesian space.

* * * * *